April 5, 1938. H. C. FRENCH 2,113,047
ROTARY DRIER
Filed Nov. 16, 1936
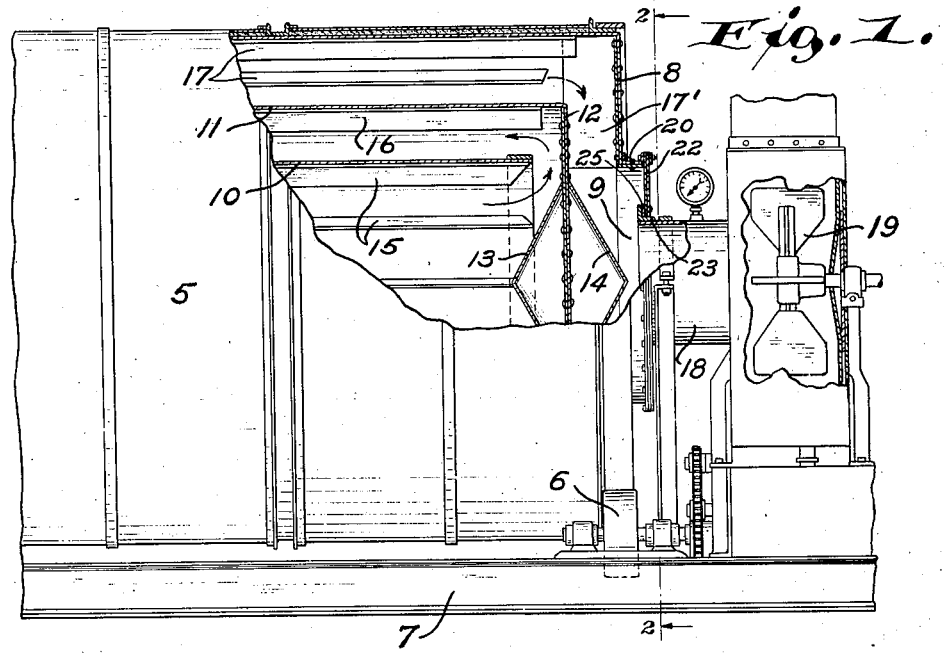
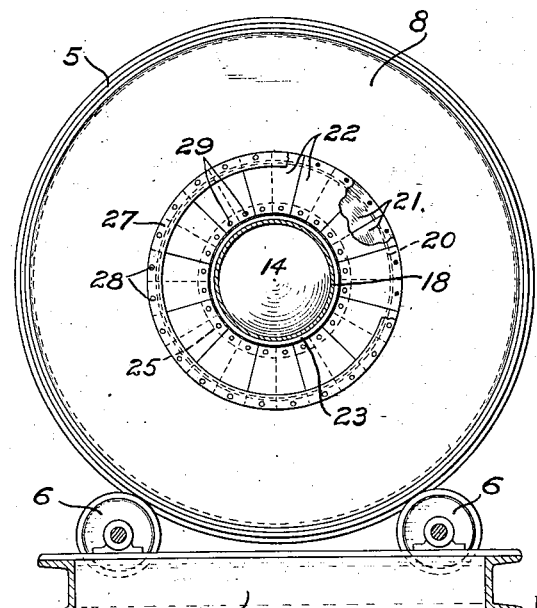
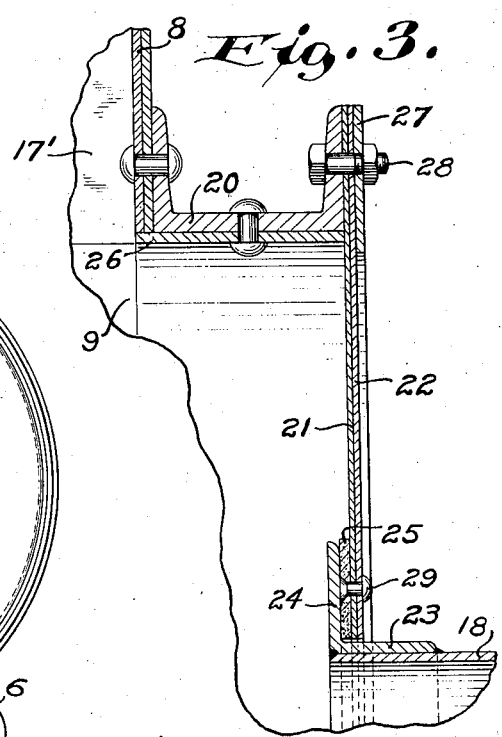
INVENTOR.
Henry C. French
BY Morsell, Lieber & Morsell
ATTORNEYS.

Patented Apr. 5, 1938

2,113,047

UNITED STATES PATENT OFFICE 2,113,047

ROTARY DRIER

Henry C. French, Milwaukee, Wis., assignor to The Heil Co., Milwaukee, Wis., a corporation of Wisconsin Application November 16, 1936, Serial No. 110,979

5 Claims. (Cl. 285—10)

The present invention relates in general to improvements in the construction and operation of machines such as rotary driers, and relates more specifically to an improved sealing device for preventing escape of gases from and undesirable ingress of air into rotary drums of various kinds.

Generally defined, an object of the present invention is to provide an improved sealing device especially adapted for application to rotary drier drums, which is simple in construction and highly efficient in operation.

Considerable difficulty has heretofore been encountered in properly sealing the ends of rotary drier drums and the like, wherein the rotary drums are of relatively large dimensions and are subject to considerable expansion and contraction, due to variations in temperature, and to possible deflection due to variable loading and pressure. The drier drums are ordinarily formed of sheet metal and have their opposite end heads provided with inlet and discharge openings of lesser diameter than the exteriors of the main drums, and these openings are usually surrounded by annular outwardly extending flanges secured to the central portions of the end heads of the drum and are rotatable with the latter. As the drum expands, contracts or deflects due to variations in temperature or pressure, these end heads and flanges move along the drum axis and relative to the stationary adjacent inlet and outlet ducts, and it has heretofore been impossible to provide a simple, durable and an effective seal between these movable drier drum elements and the adjacent fixed parts of the assemblage.

It is therefore a more specific object of my present invention to provide an improved drier drum end assemblage having a durable and highly efficient seal for automatically closing the joint between the relatively fixed and movable elements.

Another specific object of the invention is the provision of an improved seal especially applicable to drier drums or the like, which will automatically compensate for shifting or distortion of the adjacent members due to any cause during normal operation of the drier.

A further specific object of my present invention is to provide a new and useful sealing device which is extremely simple and durable in construction, and which may be readily manufactured and installed and requires no attention after proper installation thereof.

These and other objects and advantages will be apparent from the following detailed description.

A clear conception of one embodiment of the invention and of the mode of constructing and of operating the improved sealing devices, may be had by referring to the drawing accompanying and forming a part of this specification wherein like reference characters designate the same or similar parts in the several views.

Fig. 1 is a part sectional side elevation of the exhaust end of a forage drying installation, showing one of the improved seals applied thereto;

Fig. 2 is a transverse section through the assemblage of Fig. 1, taken along the line 2—2, portions of the sealing device being broken away to reveal normally hidden structure; and Fig. 3 is an enlarged section through a fragment of the improved sealing device showing the details of construction thereof.

While the improved sealing device has been shown herein as being specifically applied to the discharge end of a revolving forage drying drum, it is not the intent to thereby unnecessarily restrict the scope, and a similar seal would ordinarily be applied to the opposite inlet end of the drier drum.

Referring to the drawing, the rotary forage drier specifically illustrated, comprises in general a main outer shell or drum 5 rotatably supported upon rollers 6 carried by a supporting frame 7 and having an end head 8 provided with a central outlet opening 9; inner and intermediate cylindrical shells 10, 11 respectively mounted within and rotatable with the outer drum 5, the intermediate shell 11 being provided with an end closure 12 having opposite deflector cones 13, 14 and the closure head being spaced from the end head 8; lifting vanes 15, 16, 17 extending longitudinally within the shells 10, 11, 5 respectively, and lifting flights 17ᵃ radiating within the space between the end heads 8, 12; a stationary outlet pipe 18 communicating centrally with the interior of the drum 5 through the outlet opening 9 and having its discharge end connected to a suction fan 19; and a sealing assemblage interposed between the receiving end of the pipe 18 and the end head 8. The drier drum assemblage is normally rotatable about its longitudinal axis in any suitable manner as by rotation of the supporting rollers 6; and the outlet pipe 18 and fan 19 which are stationarily supported upon the main frame 7 normally function to draw the mixture of gas and material being treated, through the elongated circuitous passage formed by the concentric shells 10, 11, 5 in a well known manner.

The improved sealing device which is interposed between the receiving end of the fixed pipe 18 and the rotary end head 8, preferably consists of an annular ring member 20 of considerably larger diameter than the pipe 18, rigidly attached to the inner edge of the end head 8 and projecting outwardly therefrom over the receiving end of the pipe 18; a flexible diaphragm made up of overlapping plate sections or segments 21, 22, this diaphragm being firmly attached to the outer end of the member 20 and being rotatable with the drum 5; an annular element 23 secured to the receiving end of the outlet pipe 18 and having an outwardly projecting continuous flange 24 disposed within the ring member 20 and substantially parallel to the flexible diaphragm; and an annular sealing disk 25 interposed between the adjacent faces of the member 20 and of the inner segments 21 of the diaphragm.

The ring member 20 may be formed of a channel beam rolled into annular shape and may be rigidly attached to the end head 8 by riveting or welding, and this member may also be provided with a liner 26 as shown. The segments 21, 22 of the flexible diaphragm, may all be of like dimensions and interchangeable, and are caused to overlap as shown in Fig. 2 in order to avoid leakage between adjoining segments due to the lateral flexing of the diaphragm. The outer edges of the segments 21, 22 are firmly but detachably secured to the outer extremity of the ring member 20 by means of an annular clamping plate 27 and bolts 28, and the segmental construction of this diaphragm permits relatively free flexing of the inner ends of the segments 21, 22 along the axis of the drum 5. The normally fixed element 23 may be formed of angle iron rolled into an annulus, and may be rigidly attached to the end of the outlet pipe 18 by welding or otherwise. The sealing disk 25 is preferably formed of fire-proof fibrous material having lubricating qualities, and is preferably secured to the inner ends of the segments 21, 22 by means of rivets 29 as shown, although it might also be attached to the flange 24. The sealing disk 25 should however be sufficiently flexible so as not to prevent flexure of the diaphragm segments 21, 22 during expansion and contraction of the drum, and as shown, the disk 25 is rotatable with the drum 5 and has sealing contact with the fixed flange 24.

During normal operation of the drier, the drum 5 is being revolved upon the supporting rollers 6, and the suction fan 19 is operating to draw the mixture of hot drying gases and material undergoing treatment, longitudinally through the inner shell 10, through the annular space between the inner and intermediate shells 10, 11, through the annular space between the intermediate shell 11 and the drum 5, through the space between the end heads 8, 12, and through the outlet opening 9 and pipe 18, and is delivering the mixture to a separator. The lifting vanes 15, 16, 17 serve to elevate the solid material and shower the same across the interiors of the revolving cylinders, and the flights 17' likewise elevate the produce at the discharge end of the drier and precipitate the same upon the cone 14 prior to final delivery thereof through the outlet opening 9. The interior of the drier is thus subjected to pressure somewhat below atmospheric, and the drum 5 will obviously tend to expand due to the internal heating by the material conveying and drying gases, and will contract upon cooling.

The fixed inlet and discharge pipes 18 located at the opposite ends of and concentric with the drum 5, should therefore preferably be so positioned, that when the drier is cool and in contracted condition, the segments 21, 22 of the flexible diaphragm, are somewhat distorted or bent outwardly at their inner ends. As these segments 21, 22 are normally plane, they will be biased to move inwardly toward normal position as the drum 5 expands, and will thus constantly urge the sealing disk 25 toward the adjacent outer face of the flange 24 and will maintain a perfect seal. The diaphragm and sealing disk 25 are shown in normal operating position with the drum 5 expanded to the utmost, in Fig. 3, and when the drum 5 contracts, the segments 21, 22 will naturally be bent along the drum axis and will thus be placed under tension, simultaneously slightly stretching the sealing disk 25. The reduced pressure within the drum will also cause the ambient atmospheric pressure to act upon the outer face of the flexible diaphragm, and will augment the sealing effect, thus insuring a perfect and effective seal at all times.

From the foregoing description, it will be apparent that the present invention provides a most effective sealing device which is especially applicable to drier assemblages having internally reduced pressure and subjected to relatively high internal heat. The improved seal is obviously extremely simple in construction and functions to automatically maintain a tight joint under all conditions of operation of the drier, and the device is moreover very durable and requires no attention after proper installation thereof. The heat resistant sealing disk 25 also lubricates the sealed joint and does not wear out quickly, and the flexibility of this disk permits free action of the segments 21, 22. The formation of the flexible diaphragm from overlapping segments 21, 22 also permits desirably free flexing while preventing leakage of air and gases, and the improved seal has proven highly efficient and durable in actual use.

It should be understood that it is not desired to limit the present invention to the exact details of construction and to the precise mode of operation, herein shown and described, for various modifications within the scope of the claims may be apparent to those skilled in the art.

I claim:—

1. In combination, a rotary drum member, a stationary tubular member at an end of said drum member, one of said members having a surface disposed transversely to the axis of rotation of the drum member, a series of resilient segments forming a flexible diaphragm carried by the other of said members and extending in proximity to said surface, and a sealing disk confined between said diaphragm and said surface by the inherent resiliency of said segments.

2. In combination, a rotary drum, a relatively fixed tubular member at an end of said drum and having a surface disposed transversely of the drum axis, and an annular series of resilient segments secured to said drum and forming a flexible diaphragm forced into sealing coaction with said surface by the inherent resiliency of said segments.

3. In combination, a rotary drum, a relatively fixed tubular member at an end of said drum and having a surface disposed transversely of the drum axis, and two annular series of overlapping resilient segments secured to said drum and forming a flexible diaphragm which is retained in sealing coaction with said surface by the inherent resiliency of said segments.

4. In combination, a drum rotatable about an axis, a tubular member having a sealing surface surrounding said axis near an end of said drum, two adjoining annular series of metal segments secured to said end of said drum and extending in proximity to said surface, the segments of one series overlapping the joints between those of the other, and an annular seal secured to said segments and slidably engaging said surface.

5. In combination, a drum member, a tubular member, said members being relatively rotatable about an axis and one of said members having a sealing surface disposed substantially perpendicular to said axis and near an end of said other member, two loosely overlapping series of flexible segments having their corresponding ends firmly attached to said other member and their opposite corresponding ends freely deflectable toward said surface, and a seal interposed between said freely deflectable segment ends and said surface.

HENRY C. FRENCH.